United States Patent [19]
Canton

[11] Patent Number: 5,350,591
[45] Date of Patent: Sep. 27, 1994

[54] ADDITIVE FOR FOAMING COFFEE

[75] Inventor: Silvia T. Canton, North Bergen, N.J.

[73] Assignee: Guantanamo Bay, Inc., Ridgewood, N.J.

[21] Appl. No.: 944,296

[22] Filed: Sep. 11, 1992

[51] Int. Cl.$^5$ ............................ A23F 5/00; A23L 2/38
[52] U.S. Cl. .................... 426/564; 420/569; 420/594
[58] Field of Search ............... 426/561, 564, 569, 591, 426/594, 595, 562, 567

[56] References Cited

U.S. PATENT DOCUMENTS

| 4,310,560 | 1/1982 | Doster et al. | 426/285 |
| 4,746,527 | 5/1988 | Kuypers | 426/569 |

OTHER PUBLICATIONS

Food Chemistry, Edited by O. Fennema, 2nd Ed. Marcel Dekker Inc. New York, 1985, p. 118.

Primary Examiner—Donald E. Czaja
Assistant Examiner—Curtis E. Sherrer
Attorney, Agent, or Firm—Siegmar Silber

[57] ABSTRACT

A formulation for a food additive in the form of a dry powdered mixture is disclosed. The mixture is used with a hot coffee beverage—freshly brewed or prepared from instant coffee—to form a foamed head thereon. The formulation consists of a sugar, sodium bicarbonate, a releasing agent having at least two-components, and a hydrating agent. In the best mode of practicing the invention, the hydrating agent is gelatinized starch which controls both the skin-forming characteristics and the longevity of the foamed head. To preserve flavor and aroma, the total of sodium bicarbonate and the two-component releasing agent aggregates no more than 5% by weight of the food additive, the flavor remains unimpaired. Another aspect is that the foamed head formed has a skin thereover that simulates the skin formed on espresso coffee using a more complicated mode of preparation. With the coffee prepared using the additive hereof, the foamed head closely resembles in color, taste, aroma and longevity that of the steam generator prepared coffee.

20 Claims, No Drawings

ADDITIVE FOR FOAMING COFFEE

BACKGROUND OF THE INVENTION

1. Field of the Invention

This invention relates to an additive system creating a foaming head on a portion of hot coffee, and, more particularly, to a controlled foam for hot coffee using an additive without any substantial change in flavor.

2. Description of the Prior Art

Several patents descriptive of effervescent preparations or similar food additives are known to the inventor hereof. These patents are as follows:

| ITEM NO. | U.S. PAT. NO. | INVENTOR | ISSUE DATE |
|---|---|---|---|
| 1 | 1,450,865 | Pelc | 04/03/23 |
| 2 | 2,868,646 | Schapiro | 01/13/59 |
| 3 | 3,061,445 | Stanish | 10/30/62 |
| 4 | 3,441,417 | Feldman et al | 04/29/69 |
| 5 | 4,303,684 | Pitchon et al | 12/01/81 |
| 6 | 4,310,560 | Doster | 01/12/82 |
| 7 | 4,438,147 | Hedrick, Jr. | 03/20/84 |
| 8 | 4,579,742 | Lavie | 04/01/86 |
| 9 | 4,746,527 | Kuypers | 05/24/88 |

In considering the various known patents, U.S. Pat. No. 2,868,646 issued to Schapiro on Jan. 13, 1959 teaches an effervescent drink concentrate made up of two dry constituents. The first constituent is a sugar-acid crystal blend made up of 3-10 parts of crystal sugar to 1 part edible organic acid, by weight, preferably 4 parts sucrose to 1 part citric acid. A film-forming material, which may be made up of certain gums, forms a water soluble protective hull about the sugar-acid mixture. A sugar-carbonate crystal blend makes up the second constituent. This blend is formed by mixing 0.8-1.2 parts of an inorganic carbonate, preferably sodium bicarbonate, per part of acid and the balance being sugar—approximately 8 to 12 parts of sugar if 4 parts were used in the sugar-acid blend. The teaching further includes a film-forming material to protect the blend of constituents and a readily soluble hull structure to protect the crystals against premature reaction. In Schapiro, upon the mixture being introduced into cold water, a foam is produced by gas evolution.

U.S. Pat. No. 4,310,560 issued to Doster et al. on Jan. 12, 1982, teaches a method of producing a porous pelletized food product. An initial dry blend is prepared which may include sugars and starches. A chemical leavening system comprising sodium bicarbonate, and possibly sodium aluminum sulfate and monocalcium phosphate as leavening acids, is described with amounts of 1% to 5% by weight of the system making up the dry blend. Proteinaceous materials make up 5%-45% by weight of the mix. This patent teaches a mix, which is not added to hot water, but is rather subjected to the application of hot air to form porous pellets to be used in crunchy food products.

U.S. Pat. No. 4,303,684 issued to Pitchon et al. teaches a rapidly soluble sweetener. The sweetener composition preferably contain 15 to 65% fructose and may contain up to 80% sucrose. Dextrinized starch is present at a preferred level of 15% to 30%, but may be as low as 5%. The carbonating agent may include sodium bicarbonate. The patent also teaches that such compositions have a wide range of utilities, but its use as a sweetener in a dry mix for forming a cold, carbonated beverage.

Although several patents known by the inventor teach the use of sugar, starches and sodium bicarbonate, e.g. U.S. Pat. Nos. 4,310,560 and 3,441,417; teach the use of releasing agents, e.g. U.S. Pat. No. 4,310,560; and teach inducing foaminess, e.g. U.S. Pat. Nos. 2,868,646 and 4,458,147, the composition hereinbelow for use as an additive in hot beverages, specifically coffee, is not taught. There is further distinctiveness here in that the art of dry effervescent mixtures for use as beverage concentrates and the art of foamed toppings using protein, fatty acid, and foam stabilizer mixtures are here applied to thermally sensitive and flavor sensitive applications. Further, none of the known additives are described as forming a skin similar to espresso or Cuban coffee prepared using a steam generator equipped coffee maker.

Turning now to the particular beverage that is the subject hereof, namely coffee, additional background information is provided to enhance the understanding of its position and special needs in terms of related food chemistry and food technology. After indicating that the coffee bean is from a species of the madder family called Coffea Arabica, the standard food reference Larousse *Gastronomique* by Prosper Montagne (Crown Publishers, Inc.; N.Y., 1961, ed.) provides the following:

The best varieties of coffee had for a long time been those which came from Arabia, known as Moka or Yemen coffee, as well as coffee from the Bourbon (or Reunion) Island and Martinique. The names have been preserved in the trade to distinguish three types of coffee, although the designation in no way implies its origin. The three types are:

Moka—small irregular grains, yellowing in colour and convex on both sides.

Bourbon—medium-sized grains, yellowing, oblong.

Martinique—the biggest grains, rounded at the ends, greenish in colour.

Like wine, coffee gives the greatest production in the plains but the best qualities come from the higher parts of the torrid zone, particularly from Central America (Guatemala, Salvador, Honduras, Nicaragua and Costa Rica), as well as from the northern part of South America (Venezuela and Colombia) whose products are always rated among the first . . . . The coffee plant is a large evergreen shrub with dark shiny leaves. The cherry-like fruit is soaked, de-pulped, dried and the seed is then polished to remove the parchment-like husk and outer filament. The seeds are then classified as to size and ripeness. Coffees of various origins are usually blended in the trade in different proportions. When green, coffee keeps for a long time, provided it is protected from damp; keeping it, in fact, improves it. It is entirely devoid of smell. To release the aroma, coffee has to be roasted . . . Well-roasted coffee should be brown, of varying degrees of darkness, but never black. If not sufficiently roasted, it produces a colourless infusion, and is rough and astringent. If over-roasted, it produces a black infusion, bitter and unpleasant. During industrial roasting process a small quantity of sugar molasses or various other products is sometimes added, to "coat" the berries. This coating gives the berries a better colour, a more shiny appearance, and prevents the loss of aroma . . . . After roasting, coffee does not keep its aroma for long; it is, therefore, better not to roast or not to buy it all roasted in quantities exceeding one's needs, and it is advisable to keep it in jars and tins with well-fitting lids. Grinding is the last operation through which coffee has to go before being actually made. Ideally, coffee should be ground immediately before being made, as ground coffee quickly loses it aroma.

Other food chemistry sources indicate that coffee contains an alkaloid, the stimulant caffeine or 1,3,7-trimethylxanthine, and a fraction, known as "caffeol" that supplies the flavor and aroma. With this background in mind, it is readily seen that coffee as a hot beverage is a delicately balanced chemical system in which an improper additive system can quite easily unbalance the flavor and aroma. If this delicate balance is not considered, then, all the extremely careful handling (or nuturing) that is experienced during processing the plant, blending the beans, roasting, grinding, and brewing is for naught.

In the past, elaborate apparatuses have been employed to produce foams for Cuban or espresso coffees, the most popular of which is an espresso machine attributed to Gaggia (Italy; 1946) and based on a low pressure steam generator and injection system. Using such a machine the prepared espresso or Cuban coffee leaves a thick, well-defined skin behind. The additive formulation presented hereinbelow provides a similar effect by creating a wall or skin on the top of the foam which has the characteristic of adhering to the side of the espresso coffee cup.

SUMMARY

In general terms, the invention disclosed hereby includes a formulation for a food additive in the form of a dry powdered mixture. The mixture is used with a hot coffee beverage—freshly brewed or prepared from instant coffee—to form a foamed head thereon. The formulation consists of a sugar, sodium bicarbonate, a releasing agent having at least two-components, and a hydrating agent. In the best mode of practicing the invention, the hydrating agent is gelatinized starch which controls both the skin-forming characteristics and the longevity of the foamed head. An important aspect of the technology developed in the course of this invention is the determination of flavor and aroma impingement by this class of additive. To preserve flavor and aroma, it has been found that, when the total of sodium bicarbonate and the two-component releasing agent aggregates no more than 5% by weight of the food additive, the flavor remains unimpaired. Another aspect is that the foamed head formed has a skin thereover that simulates the skin formed using a more complicated mode of preparation, namely, the steam generator equipped espresso coffee maker. With the coffee prepared using the additive hereof, the foamed head closely resembles in color, taste, aroma and longevity that of the steam generator prepared coffee.

OBJECT AND FEATURES OF THE INVENTION

It is an object of the present invention to provide a dry formulation for addition to a brewed cup of coffee and to form a foamed head thereon.

It is a further object of the present invention to provide an espresso or Cuban coffee without using a steam generating apparatus.

It is yet another object of the present invention to provide a foamed head on the brewed coffee without altering the flavor or aroma of the coffee being treated.

It is still yet another object of the present invention to provide an additive system which performs optimally at 80 degrees C. (approx.).

It is a feature of the present invention that the head of foam is designed to last during the period of consumption of the beverage and to simulate the foamed head as those espressos made by steam generator equipped coffee makers.

It is another feature of the present invention that the additive hereof is utilizable with an instant coffee dissolved in hot water to produce a foamed head as described hereinbelow.

It is another feature of the present invention that the additive system has no flavor or aroma.

It is yet another feature of the present invention to operate within the thermal parameters set forth.

Other objects and features of the invention will become apparent upon review of the detailed description which follow.

DESCRIPTION OF THE PREFERRED EMBODIMENT

Creating foamed portions of foods is always a critical task. The foamed head, whether champagne, beer, or espresso, must meet and pass critical palates, critical temperature ranges, and critical times (or holding power). Espresso coffee, unlike the other foods mentioned, is served and consumed at high temperatures. The carbonation needs to be instantly available before the temperature drops below the desired consumption temperature. The releasing agents, which drive the reaction forward, must be fast-acting and enable the reaction to go quickly to completion. Part of the esthetics of espresso coffee drinking is found in the trace of foam adhering to the cup after the beverage is consumed. The tracery validates the espresso experience, and, in technical terms, the hydrating agent, which governs the bubble size and holding time, needs to be one that supports a foam and leaves a trace similar to that created using a steam generator equipped espresso machine.

In the invention at hand, a food additive system has been developed, namely; a foaming agent for preparing Cuban or espresso coffee. The food additive system hereof is a thermally sensitive combination depending on sodium bicarbonate and releasing agents to release carbon dioxide gas into a sugar and starch combination under predetermined conditions. As food additive formulations are frequently technically difficult to explain, for purposes of this application, several definitions are provided. The term "activating or releasing agent" is defined as an ingredient or a combination of ingredients which reacts with sodium bicarbonate in a hot beverage so as to release carbon dioxide gas. For example, in the best mode, the releasing agent, hereinbelow, is a two-component combination—a monocalcium phosphate and sodium aluminum phosphate combination. Additionally, for the purposes of this application, "sugar" is defined as including food grade additives, namely the monosaccharides, glucose and fructose; the naturally occurring disaccharides, sucrose, lactose, and maltose; and, mixtures thereof. It is also necessary to define the "hydrating" agent, which, in the best mode is a gelatinized starch. This is particularly important insofar as it has been found that, while ungelatinized raw starches may be used, such starches, when in contact with water, tend to lump quickly. However, if a gelatinized starch is selected, the problem is avoided as gelatinized (or pregelatinized) starches go quickly into suspension giving a clear appearance and an even distribution. Further, as gelatinization temperatures vary depending on the species from which the starch is derived, e.g. potato, rice, wheat, corn, and tapioca starch, it is necessary to select a starch that performs and sustains its integrity at coffee temperature, namely, 70° to 90° C. In this application, this is important because when the temperature exceeds the gelatinization temperature, the starch gel (skin) loses its structure. Thus, low temperature gelatinization starches are not selected and pregelatinized corn starch is the starch of choice. Although pregelatinized corn starch, Cat. No. National 1215 (National Starch and Chemical Corp., Finderne Avenue, Bridgewater, N.J. 08807), or equivalent, is recommended for this dry mix product; any other processed food-grade starch with the same time vs. temperature viscosity (gelatinization profile or amylograph) will suffice. The viscosity increases with heat, and forms a desirable thick skin.

The releasing agents, usually salts, have both fast dissolving and thermally sensitive components. For example, in the best mode, the two-component releasing agent has monocalcium phosphate, which dissolves quickly and once in solution reacts rapidly with the sodium bicarbonate and sodium aluminum phosphate, which is thermally sensitive and releases carbon dioxide more rapidly at higher temperatures. For the two component releasing agent, the first component is selected from a group consisting of monocalcium phosphate, fumaric acid, and citric acid in the proportion and weight shown and described in the examples hereof. Likewise, the second component is selected from a group consisting of sodium aluminum phosphate, sodium aluminum sulphate, and dicalcium phosphate dihydrate. The releasing agents also impact the bubble size which is a critical parameter hereof. The bubbles are equal in size, generally in the range of 1 to 2 mm in diameter, and give the appearance of an even surface without larger or smaller bubbles. This effect is produced by the combination of the two releasing agents, monocalcium phosphate and sodium aluminum phosphate.

Besides the food additive system hereof complying with taste and aroma requirements, the foam produced thereby meets certain preconditions of bubble size, temperature stability, and holding time. In the best mode, the releasing agents are substantially equal quantities of monocalcium phosphate and sodium aluminum phosphate. In general terms, the dry formulation is approximately as follows:

Sugar 90%
Starch, gelatinized 5%
Sodium bicarbonate 3%
Monocalcium phosphate 1%
Sodium aluminum phosphate 1%

In developing this formulation, it has been found that if the sodium bicarbonate and the releasing agents are kept within 5%, the flavor and aroma remain unaffected by the additive. In preparing the dry mixture, the gelatinized starch is thoroughly blended with the sugar, which acts as a dry diluent. The other components are then blended until an even distribution is obtained. The presence of the dry diluent tends to effect a more even hydration of the starch and minimizes any tendency towards lumping.

After preparation of the dry mixture, it is convenient to divide the preparation into single-service quantities in a manner similar to the familiar single teaspoonful sugar packets. Each unit constitutes approximately 1 teaspoonful or about 5 gms. A coffee beverage is prepared either from instant espresso or using a household-type espresso coffee pot.

Typically, an espresso coffee pot is used to prepare the coffee, this pot consists of three parts: (a) a bottom portion where water is placed and heated to its boiling point; (b) an aluminum cup with perforations where the espresso coffee grounds are placed; and, (c) a top portion where the brew coffee is collected. This system is not hot enough to produce a head in the coffee as it would be possible with a steam generator such as the Gaggia model. Then, during beverage preparation, the dry mixture is sprinkled onto a hot beverage. The heat and the releasing agents, namely, monocalcium phosphate and sodium aluminum phospate, break down the sodium bicarbonate to release carbon dioxide gas. Then because the gas is trapped in the wetted sugar, a head of foam begins to generate. The bubble size of the foam is further impacted by the gelatinized starch which is the hydrating agent. The espresso coffee prepared as above is usually consumed within 1 to 2 minutes, and, therefore, the foam has a short time requirement. With this additive, the foaming effect resembles that achieved with a steam generator equipped espresso maker.

In the examples which follow, specific forms of the formulation are provided showing the range of ingredients and the proportions thereof.

EXAMPLE #1

Preparation of a food additive in the form of a dry powdered mixture usable with a hot coffee beverage for forming foamed head thereon:

Dry free-flowing sugar, starch gelatinized, sodium bicarbonate, monocalcium phosphate and sodium aluminum phosphate were weighed accurately using an analytical balance to provide the following formulation;
1. sugar—90 grams
2. gelatinized starch, National 1215—5 grams
3. sodium bicarbonate—3 grams
4. monocalcium phosphate—1 gram
5. sodium aluminum phosphate—1 gram
(Multiples of this proportion can be prepared if a large number of experiments are considered.)

Using a laboratory scale V-blender, the mixture was thoroughly blended for about 5 minutes to insure a homogenous distribution of all the components. This contributes to ensuring the uniform release of the carbon dioxide in the espresso coffee.

In use, the gelatinized starch, National 1215 begins to swell or thicken as soon as it is added to the hot beverage. The time vs. temperature profile is such that the foam develops additional viscosity with time. Higher starch levels develops a more rigid, longer lasting foam. The viscosity also increases slightly with higher beverage temperatures.

Prepare the coffee using an Italian made espresso coffee maker (Vandel or similar). These are low pressure aluminum coffee pots consisting of two compartments and a screen-type filter receptacle where the coffee is placed. Once the water in the lower compartment reaches boiling, it percolates through the coffee grounds and is collected in the top portion of the pot. ( Under these conditions no foam is generated.)

The coffee is immediately placed in an espresso coffee cup approximately (60–70 cc) and is poured to ¾ capacity. Then 1 teaspoonful of the preparation is slowly sprinkled over the coffee. Then once all of the sugar and other ingredients are dispersed, a quick turn with the spoon should provide a full bodied foamed head to the coffee cup. As a rule, the espresso drinkers do not take longer than 2 to 4 minutes to complete this procedure from the beginning to the last drink.

Best results are achieved if the blend is packed in an envelope to generate the foam gradually to give enough time for the carbon dioxide to evolve.

EXAMPLE #2

Prepare ingredient/blend as in Example 1.—following formulation;
1. sugar—88 grams
2. unmodified cornstarch—7 grams
3. sodium bicarbonate—2 grams
4. fumaric acid—1.5 grams
5. sodium aluminum sulphate—1.5 grams Application of blend using instant espresso coffee.
1. heat sufficient water to boiling;
2. pour water to fill ¾ of the 60 cc espresso cup;
3. sprinkle 1 teaspoonful of the blend slowly while stirring with a spoon. A head similar to the one obtained using the espresso made with a steam generator equipped coffee maker is obtained.

EXAMPLE #3

(Preparation of coffee using an Italian coffee maker as in Example 1.)
a. Prepare mixture
1. sugar—92 grams
2. gelatinized starch—3 grams
3. sodium bicarbonate—4 grams
4. citric acid—0.5 gram
5. dicalcium phosphate dihydrate—0.5 gram
b. Proceed to prepare coffee as in Example 1.

Serving approach for those who prefer a much sweeter coffee. Add plain sugar first then add 1 teaspoonful of the foaming mixture.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A food additive in the form of a dry powdered mixture usable with a hot coffee beverage for forming a foamed head thereon comprising:
   a sugar forming 85 to 94% by weight of said mixture;
   a food-grade starch forming 3 to 7% by weight of said mixture, for enabling starch gel skin formation over said foamed head;
   sodium bicarbonate forming 2 to 4% by weight of said mixture;
   a two-component releasing agent forming 1 to 3% by weight of said mixture such that the total of sodium bicarbonate and said two-component releasing agent aggregates no more than 5% by weight of said mixture;
   said food additive, upon addition of a predetermined amount thereof to a hot cup of coffee, forming a foamed head thereon with a starch gel skin thereover without affecting the flavor and aroma of the coffee.

2. The food additive composition as described in claim 1 wherein the two-component releasing agent is, in turn, comprised of:
   a first component selected from the group consisting of monocalcium phosphate, fumaric acid, and citric acid forming 0.5 to 1.5% by weight of said mixture; and,
   a second component selected from the group consisting of sodium aluminum sulphate, sodium aluminum phosphate, and dicalcium phosphate dihydrate forming 0.5 to 1.5% by weight of said mixture.

3. The food additive composition as described in claim 2 wherein:
   said first component is monocalcium phosphate forming 1.0 to 1.5% by weight of said mixture; and,
   said second component is sodium aluminum phosphate forming 0.5 to 1.5% by weight of said mixture;
   wherein said sodium bicarbonate, said first component, and said second component aggregate no more than 5% by weight of the food additive.

4. The food additive composition as described in claim 3 wherein the weight of the monocalcium phosphate and the weight of the sodium aluminum phosphate are substantially equal.

5. The food additive composition as described in claim 1 wherein the addition of up to 5 grams thereof to 60 ml. of hot coffee at 70° to 90° C. gelatinizes said food-grade starch thereof and releases sufficient gases to provide a foamed head.

6. The food additive composition as described in claim 5 wherein said starch gel skin over the foamed head is characterized by substantially increasing viscosity with temperature.

7. The food additive composition as described in claim 6 wherein said foamed head is characterized by time and temperature stable bubbles so as to maintain the foamed head throughout a 2- to 4-minute time period during which the beverage is consumed and said bubbles are maintained below 1 to 2 mm. in diameter.

8. A food additive in the form of a dry powdered mixture usable with a hot coffee beverage for forming a foam head thereon comprising:
   a sugar forming 85 to 94% by weight of said mixture;
   a hydrating agent forming 3 to 7% by weight of said mixture;
   sodium bicarbonate forming 2 to 4% by weight of said mixture;
   a two-component releasing agent forming 1 to 3% by weight of said mixture such that the total of sodium bicarbonate and said two-component releasing agent aggregates no more than 5% by weight of the food additive;
   said hydrating agent, upon addition of a predetermined amount of the food additive to a hot cup of coffee, forming a viscous skin thereover without affecting the flavor and aroma thereof.

9. The food additive composition as described in claim 8 wherein said viscous skin is a starch gel becoming increasingly viscous in the 80° to 90° temperature range; and,
   wherein said foamed head is characterized by substantially time and temperature stable bubbles.

10. The food additive composition as described in claim 9 wherein the hydrating agent is selected from a food-grade starch gelatinized starch and unmodified cornstarch.

11. The food additive composition as described in claim 10 wherein the addition of 5 grams thereof to 60 ml of hot coffee at 80° to 90° C. releases sufficient gases to provide a foamed head.

12. The food additive composition as described in claim 11 wherein the foamed head is characterized by substantially time and temperature stable bubbles so as to maintain the foamed head throughout a 2- to 4-minute time period during which the beverage is consumed.

13. The food additive composition as described in claim 12 wherein said bubbles are maintained below 1 to 2 mm. in diameter.

14. The food additive composition as described in claim 9 wherein the two-component releasing agent is, in turn, comprised of:
   a first component selected from the group consisting of monocalcium phosphate, fumaric acid, and citric acid forming 0.5 to 1.5% by weight of said mixture; and,
   a second component selected from the group consisting of sodium aluminum phosphate, and sodium aluminum sulphate forming 0.5 to 1.5% by weight of said mixture;
   wherein said sodium bicarbonate, said first component, and said second component aggregate no more than 5% by weight of the food additive.

15. The food additive composition as described in claim 14 wherein:
   said first component is monocalcium phosphate forming 1.0 to 1.5% by weight of said mixture; and,
   said second component is sodium aluminum phosphate forming 0.5 to 1.5% by weight of said mixture;
   wherein said sodium bicarbonate, said first component, and said second component aggregate no more than 5% by weight of the food additive.

16. The food additive composition as described in claim 15 wherein the weight of the monocalcium phosphate and the weight of the sodium aluminum sulphate are substantially equal.

17. A food additive in the form of a dry powdered mixture usable with a hot coffee beverage for forming a foam head thereon comprising:
   a sugar forming 90% by weight of said mixture;
   a gelatinized starch forming 5% by weight of said mixture;
   sodium bicarbonate forming 3% by weight of said mixture;
   a two-component releasing agent forming 2% by weight of said mixture such that the total of sodium bicarbonate and said two-component releasing agent aggregates no more than 5% by weight of the food additive, said two-component releasing agent, in turn, comprising;
   a first component being monocalcium phosphate forming 1.0% by weight of said mixture; and,
   a second component being sodium aluminum phosphate forming 1.0% by weight of said mixture;
   said gelatinized starch, upon addition of a predetermined amount of the food additive to a hot cup of coffee, forming a skin thereover and releasing sufficient gases to provide a foamed head thereon without affecting the flavor and aroma of the coffee.

18. The food additive composition as described in claim 17 wherein the addition of 5 grams thereof to 60 ml of hot coffee at 70° to 90° C. releases sufficient gases to provide a foamed head.

19. The food additive composition as described in claim 18 wherein the foamed head is characterized by substantially time and temperature stable bubbles so as to maintain the foamed head throughout a 2- to 4-minute time period during which the beverage is consumed.

20. The food additive composition as described in claim 19 wherein said bubbles are maintained below 1 to 2 mm. in diameter.

* * * * *